G. W. PRICE.
Thill Coupling.

No. 100,802.

Patented March 15, 1870.

Witnesses:
Elisha Van Santt
M. J. Palmer

Inventor:
George W. Price

United States Patent Office.

GEORGE W. PRICE, OF ADRIAN, MICHIGAN.

Letters Patent No. 100,802, dated March 15, 1870.

IMPROVEMENT IN THILL-COUPLINGS.

The Schedule referred to in these Letters Patent and making part of the same.

I, GEORGE W. PRICE, of Adrian, in the county of Lenawee, and State of Michigan, have invented certain Improvements in Thill-Couplings, of which the following is a specification.

The nature of my invention consists in the use of a hooked draw-jack for thill-coupling, with a lid hung upon a pin directly over the center of the eye, and held down by a bolt and nut.

In the drawings—

A is the hinged lid, turning upon the pivot $t$ in the end of the hook B;

E is the eye, and $o$, the leather or rubber bushing;

$m$, the bolt; and $n$, the nut;

S is the yoke, bent around the axle-tree; and

L, the washer, to hold it in its place.

The hook or clip B of this coupling is supported on the front face of the usual axle-yoke, and consists of a bracket or hook, extending forward from the axle-yoke, and turning up over the opening or depression for the thill-iron, to the center of said opening or depression.

The lid or cap A is hinged to the extremity of said hook or bracket B, above the center of said depression, for the purpose of holding down the thill-iron E and the rubber or leather bushing $o$ in its place, and is held down and secured in its place by the screw-bolt $m$ and nut $n$.

The rubber or leather bushing is used in the same manner as formerly, there being nothing new claimed about it.

Figure 1:
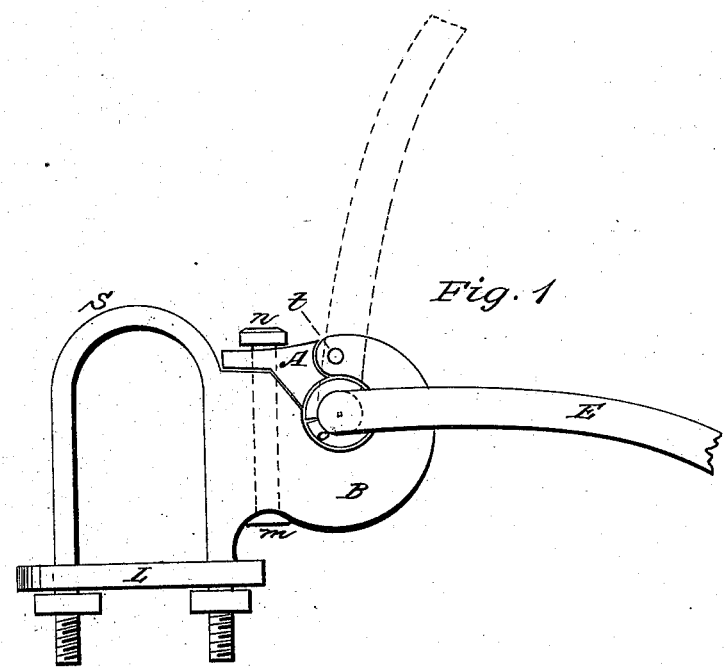
Figure 1 is a side elevation of my improved coupling in complete working order.
Figure 2:
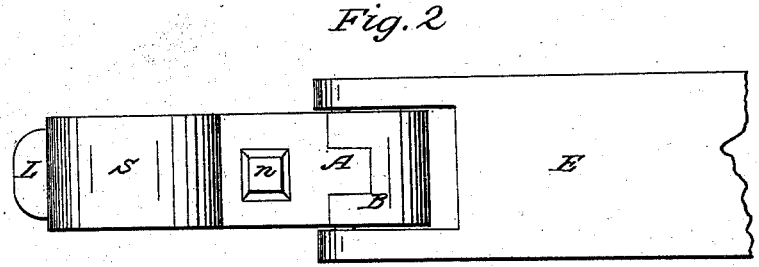
Figure 2 is a view of the upper side of the same.

As the forward wheels of the vehicle frequently descend into low places, and the horse at the same time rises upon an elevation, the draft is instantly thrown to nearly a right angle with a central line of the hook B, as shown by the dotted lines in fig. 1.

To increase the strength of the coupling and avoid breakages in such a case, the whole is so constructed that the draft shall come entirely and at all times on the hook, and that in shifting the thill-iron E it shall be raised upward and shoved backward.

In this way all strain is taken off of the hinge-cap A, a fact that adds materially to the value of my improvement over others in use.

Claim.

What I claim as my invention is—

The bracket or hook B, in combination with the cap A, hinged directly over the eye, and fastened with the screw-bolt $m$ and nut $n$, that the draft shall come on said hook, for the purposes and in the manner set forth and described.

GEORGE W. PRICE.

Witnesses:
O. J. PRICE,
M. N. HALSEY.